(12) United States Patent
Holcomb

(10) Patent No.: US 9,943,038 B2
(45) Date of Patent: *Apr. 17, 2018

(54) PLANT TRIMMER

(71) Applicant: Russell Elbridge Holcomb, Grass Valley, CA (US)

(72) Inventor: Russell Elbridge Holcomb, Grass Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,507

(22) Filed: Jun. 8, 2016

(65) Prior Publication Data

US 2016/0278299 A1 Sep. 29, 2016

Related U.S. Application Data

(63) Continuation of application No. 14/273,250, filed on May 8, 2014, now Pat. No. 9,380,805.

(60) Provisional application No. 61/820,858, filed on May 8, 2013.

(51) Int. Cl.

| | |
|---|---|
| *A01G 3/04* | (2006.01) |
| *A23N 15/02* | (2006.01) |
| *A23N 15/12* | (2006.01) |
| *A23N 15/00* | (2006.01) |
| *B26D 1/38* | (2006.01) |
| *B26D 7/00* | (2006.01) |

(52) U.S. Cl.
CPC ........... *A01G 3/0435* (2013.01); *A23N 15/00* (2013.01); *A23N 15/02* (2013.01); *A23N 15/12* (2013.01); *B26D 1/38* (2013.01); *B26D 2007/0018* (2013.01); *Y10T 83/2081* (2015.04)

(58) Field of Classification Search
CPC ........ A23N 15/00; A23N 15/02; A23N 15/12; A23N 15/025; A01G 3/0435; A01G 17/00; B26D 1/38; B26D 3/18; B26D 2007/0018
USPC ........... 56/1, 156; 460/134; 83/404.2, 404.3, 83/403, 440; 99/636, 637, 639; 241/30, 241/60, 74, 81, 147, 166, 235
See application file for complete search history.

(56) References Cited

U.S. PATENT DOCUMENTS

| | | | | |
|---|---|---|---|---|
| 1,336,991 | A * | 4/1920 | Urschel | A23N 15/12 83/403 |
| 1,358,002 | A * | 11/1920 | Lash | A23N 15/12 83/404.2 |
| 3,472,297 | A * | 10/1969 | Urschel | B26D 3/18 83/404.3 |
| 8,127,668 | B2 * | 3/2012 | Snyder, Jr. | A23N 15/02 99/636 |

(Continued)

*Primary Examiner* — Robert E Pezzuto

(57) ABSTRACT

A leafy plant trimmer that is operable by a single person has a basket that is rotated in relation to a stationary sling in order to trim plants placed within the basket. The basket and the sling are housed within a trimmer body that is pivotally connected to a pivot stand. The trimmer body can be rotated between a product loading position for filling the basket and an in-use position for trimming the plants within the basket. A motor housed in the trimmer body spins the basket through a drive shaft. The motor is electrically connected to a timer such that the trimmer can be operated at designated time intervals. Trimmings are expelled from the trimmer body through a debris hole and collected below. A first receptacle attachment and a second receptacle attachment are positioned below the trimmer body and allow a receptacle to be positioned for collecting the trimmings.

17 Claims, 15 Drawing Sheets

(56) References Cited

U.S. PATENT DOCUMENTS 8,757,524 B2 * 6/2014 Mosman .................. A01G 3/08
241/166

* cited by examiner

PLANT TRIMMER

The current application is a continuation of U.S. Utility patent application Ser. No. 14/273,250 filed on May 8, 2014 which claims benefit to U.S. Provisional Patent Application Ser. No. 61/820,858 filed on May 8, 2013.

FIELD OF THE INVENTION

The present invention relates generally to a machine used to trim plants. Furthermore, the trimmer can be operated by a single person.

BACKGROUND OF THE INVENTION

It is often necessary for plants to be trimmed once they have been harvested. Trimming can be performed for any number of reasons and is often done by hand. When hand trimming is performed it is often done at the time the plant is cut down, also known as wet trimming. Wet trimming is preferred when trimming by hand as it is easier to cut and handle the plant. Trimming that is performed by hand often takes a great deal of time especially when dealing with large and frequent harvests. Thus, some machines have been designed that allow leafy plants to be trimmed while dry. However, these machines are large and require multiple people to load and operate the machine.

Therefore it is the object of the present invention to provide a machine used to trim leafy plants that can be operated by a single person. The trimmer body of the present invention is mounted to a pivot stand that allows the trimmer body to rotate three hundred and sixty degrees. In this way the trimmer can be easily rotated to a loading position, an in use position and a product removal position by a single person. The present invention also features a sling with angled cuts that creates a pulling action with the spinning basket and in turn trims the desired product. The sling is positioned further away from the basket towards the bottom such that the leaves of the product may fall into the gap between the sling and the basket. The sling is positioned closer to the basket towards the sides such that the leaves are pinched between the sling and the basket and pulled off. Adjustment knobs are used to adjust the sling height and in turn control the level of trim. Additionally, the present invention features a timer such that it can be set to run for a predetermined amount of time.

DETAIL DESCRIPTIONS OF THE INVENTION

Figure 1:
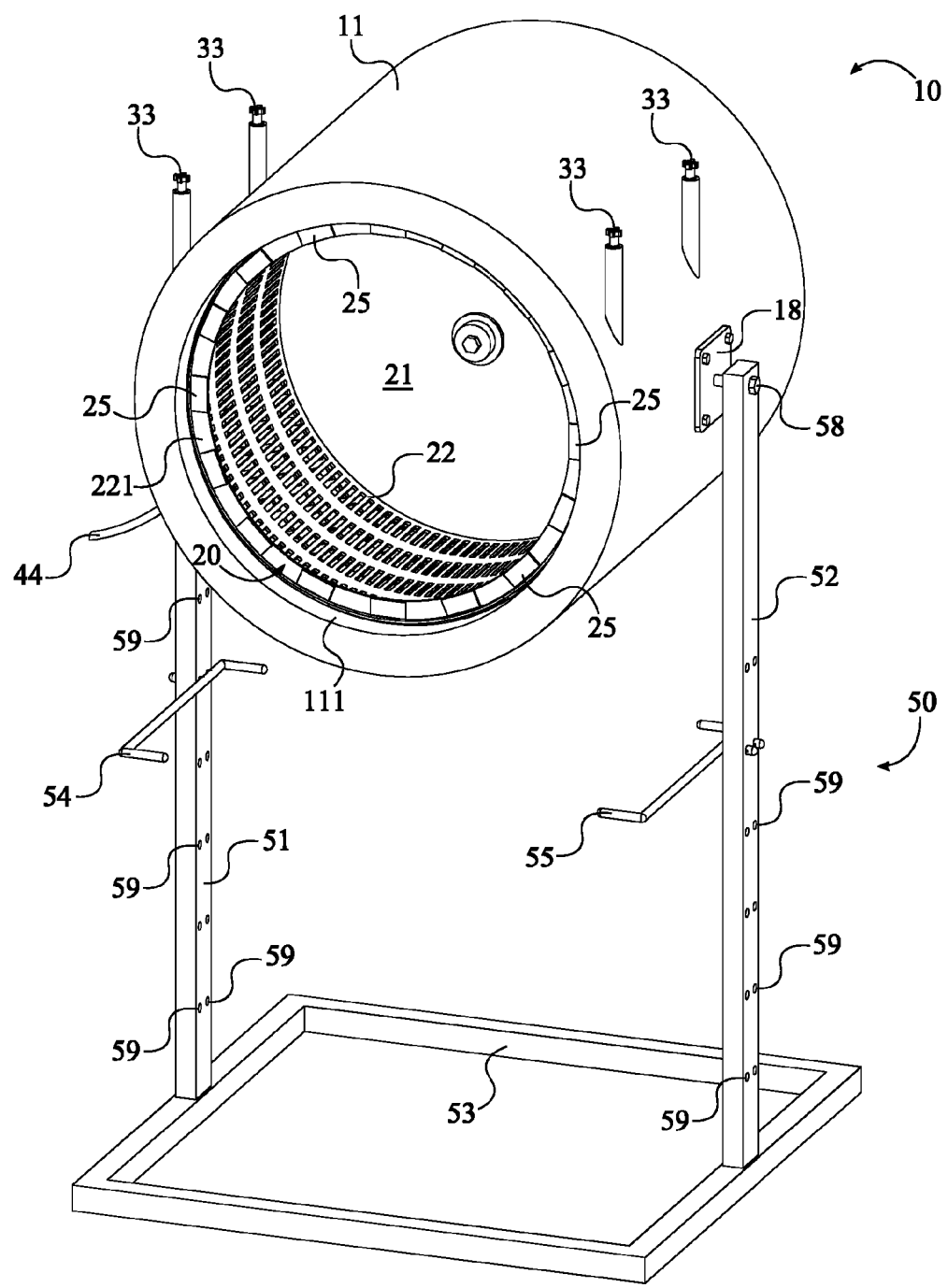
FIG. 1 is a perspective view of the present invention with the basket lid removed.

All illustrations of the drawings are for the purpose of describing selected versions of the present invention and are not intended to limit the scope of the present invention.

The present invention is a leafy plant trimmer that can be used to trim and manicure any type of leafy plant. The leafy plant trimmer comprises a trimmer body 10, a basket 20, a sling 30, a motor assembly 40, and a pivot stand 50.

The trimmer body 10 is pivotally connected to the pivot stand 50, such that the trimmer body 10 can be rotated between a product loading position and an in-use position. In the product loading position depicted in FIG. 6, the trimmer body 10 is rotated such that the basket 20 is parallel to the ground, with the motor assembly 40 being positioned below the basket 20. When the leafy plant trimmer is turned on, power is supplied to the motor assembly 40 which in turn spins the basket 20. The sling 30 remains stationary as the basket 20 spins, creating a pulling motion between the basket 20 and the sling 30 that acts to trim the product placed in the basket 20. As the product is trimmed, the trimmings are collected in a receptacle mounted to the pivot stand 50, below the trimmer body 10.

The trimmer body 10 comprises a lateral wall 11, a divider wall 12, a debris opening 13, an access panel 14, a first mount plate 17, and a second mount plate 18. In reference to FIG. 6-7, the lateral wall 11 of the trimmer body 10 is a cylinder that houses the basket 20, the sling 30, and the motor assembly 40. The lateral wall 11 can also be in any other number of shapes. In the preferred embodiment of the present invention, the trimmer body 10 is made from metal, however, any other type of material may be used to construct the trimmer body 10. Additionally, in the preferred embodiment of the present invention, the lateral wall 11 is constructed from a single piece of material, however, the lateral wall 11 can also be constructed from multiple sections which can be held together using any suitable means of connection.

Figure 6:
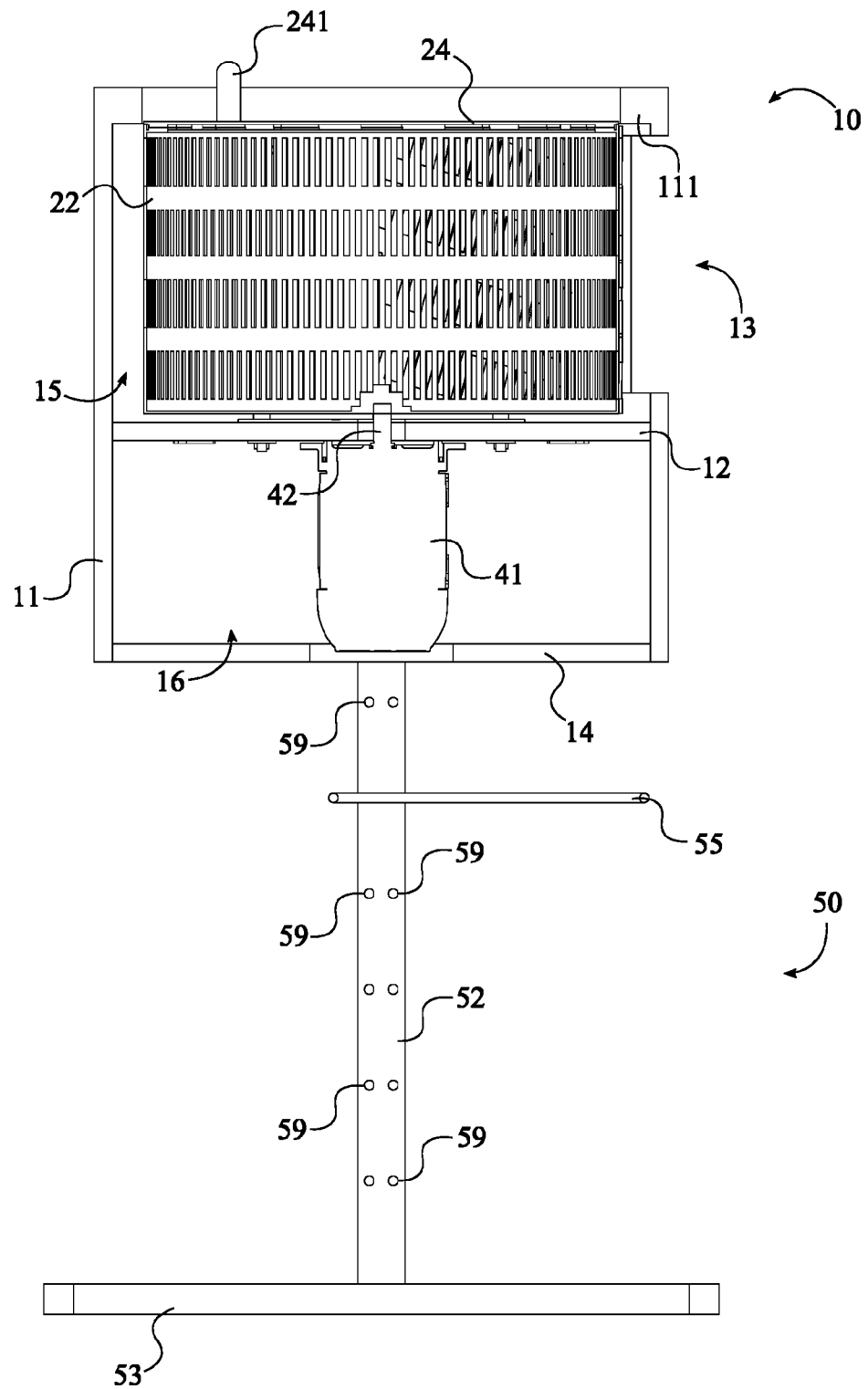
FIG. 6 is a left side sectional view of the present invention with the trimmer body in the product loading position.
Figure 7:
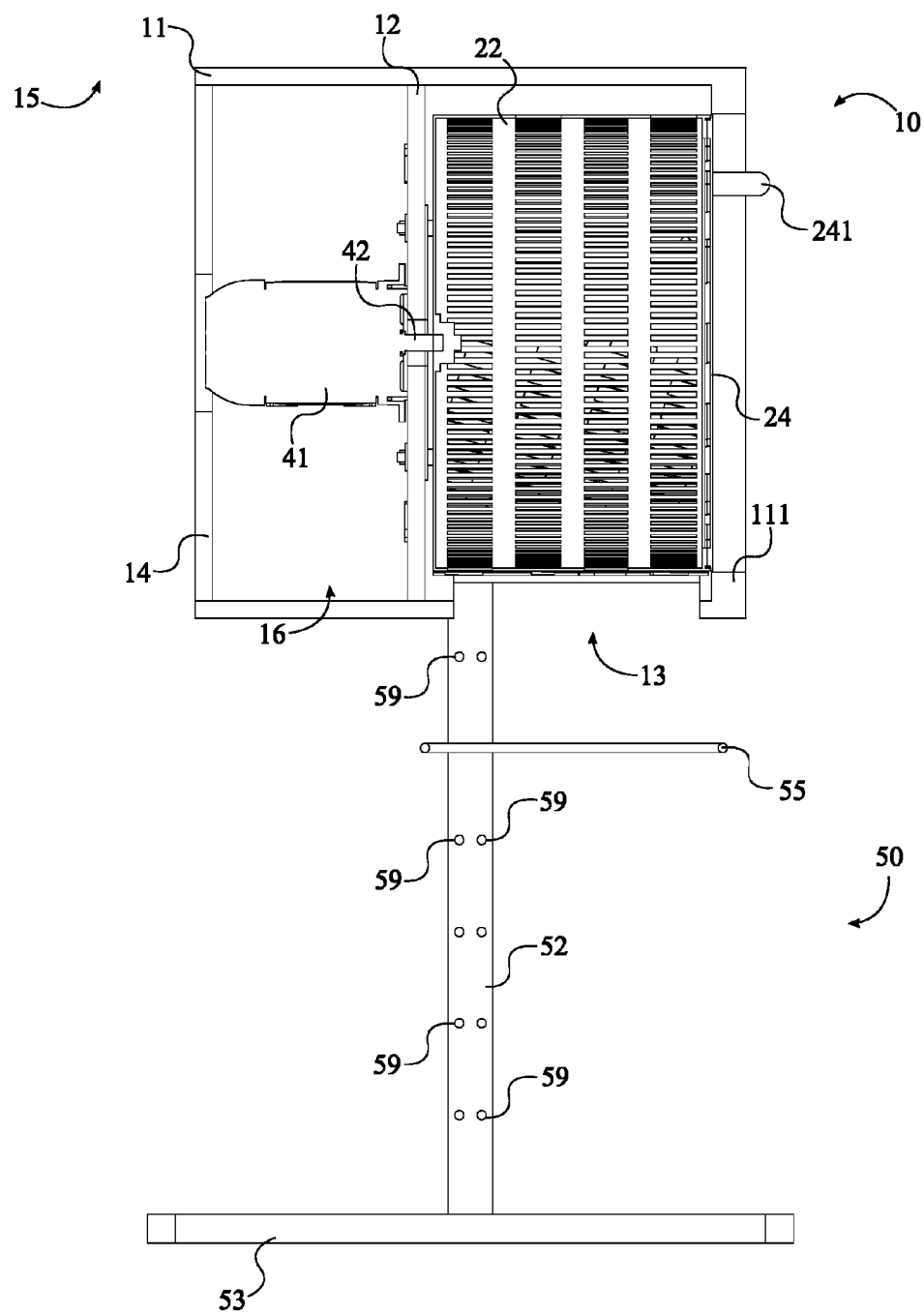
FIG. 7 is a left side sectional view of the present invention with the trimmer body in the in-use position.

The lateral wall 11 is pivotally connected to the pivot stand 50 such that the trimmer body 10 can be rotated between the product loading position and the in-use position. In reference to FIG. 8, the divider wall 12 is positioned within the lateral wall 11 and is perimetrically connected to the lateral wall 11. In the preferred embodiment of the present invention, the divider wall 12 is secured to the lateral wall 11 by means of a plurality of brackets and screwed connections; however, the divider wall 12 may also be secured to the lateral wall 11 by any other connection means, such as using an adhesive, epoxy or nails. The divider wall 12 separates the trimmer body 10 into a first trimmer body section 15 and a second trimmer body section 16. The first trimmer body section 15 houses the basket 20 and the sling 30, while the second trimmer body section 16 houses the motor assembly 40, as depicted in FIG. 6-7.

In reference to FIG. 1, the lateral wall 11 comprises a lip 111 that is positioned around the lateral wall 11 and within the first trimmer body section 15. More specifically, the lip 111 is positioned opposite the divider wall 12 along the first trimmer body section 15, such that the basket 20 is positioned in between the lip 111 and the divider wall 12. The lip 111 overlays the gap between the basket 20 and the lateral wall 11, such that an individual cannot stick their extremities in between the basket 20 and the lateral wall 11 when the basket 20 is being spun.

Figure 3:
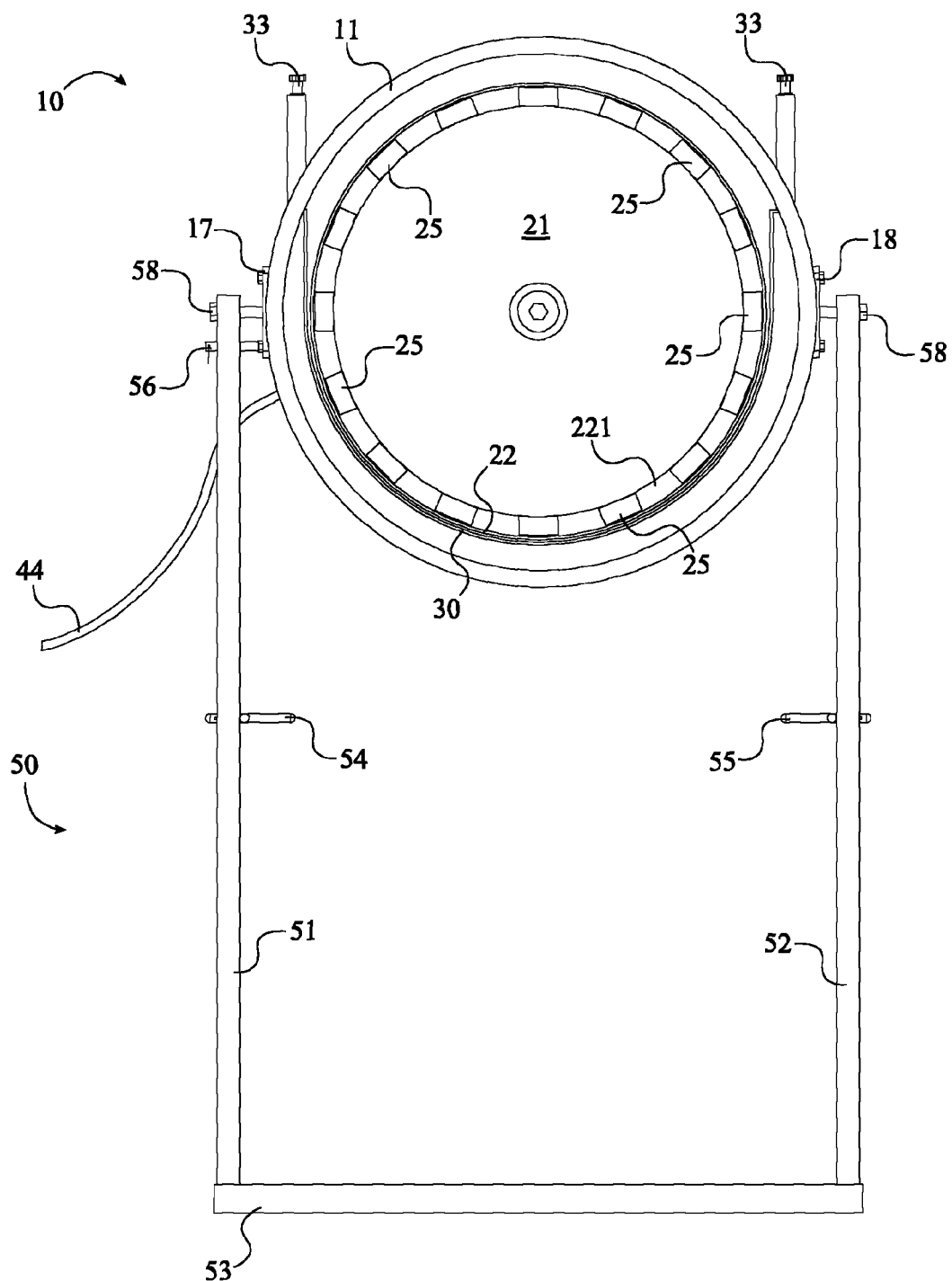
FIG. 3 is a front sectional view of the present invention.
Figure 4:
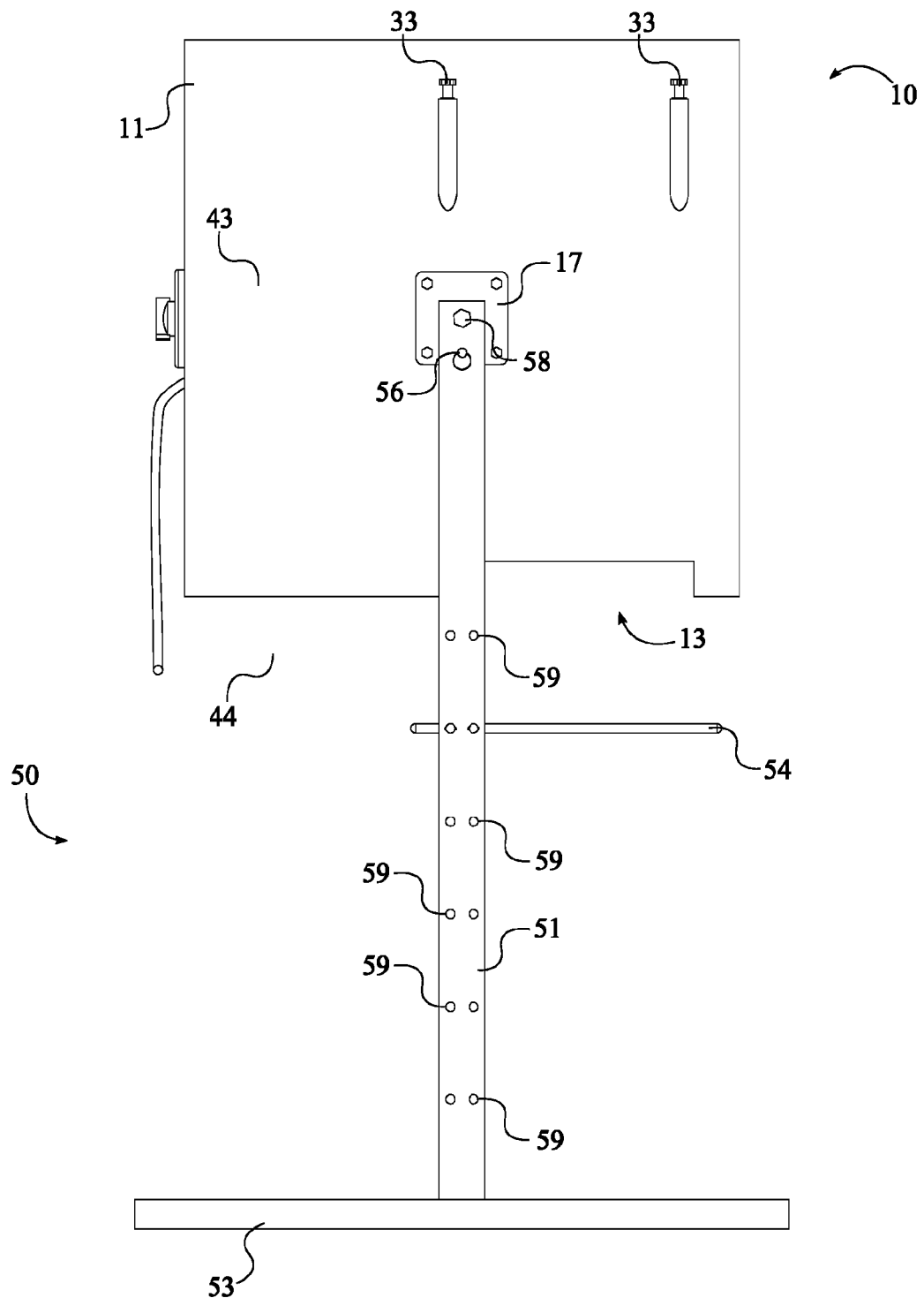
FIG. 4 is a left side elevational view of the present invention.

In reference to FIG. 3, the first mount plate 17 and the second mount plate 18 are adjacently connected to the lateral wall 11 opposite the first trimmer body section 15 by means of a plurality of screws. The first mount plate 17 and the second mount plate 18 may also be connected to the lateral wall 11 using any other means of connection. The first mount plate 17 and the second mount plate 18 are positioned opposite each other about the lateral wall 11, and provide the point of connection between the trimmer body 10 and the pivot stand 50. The first mount plate 17 has at least one recess 171 that is used for locking the trimmer body 10 in the product loading position and/or the in-use position.

In reference to FIG. 3, the basket 20 and the sling 30 are positioned within the first trimmer body section 15. A motor 41 mounting plate is also positioned within the first trimmer body section 15 and is secured to the divider wall 12 using a plurality of screws. The motor 41 mounting plate can also be secured in any number of other ways. The basket 20 is positioned adjacent to the motor 41 mounting plate, such that the motor 41 mounting plate is positioned in between the divider wall 12 and the basket 20. The basket 20 is concentrically mounted within the lateral wall 11, while the sling 30 is mounted to the top of the lateral wall 11 (when the trimmer body 10 is in the in-use position) and surrounds the bottom half of the basket 20. The sling 30 can be adjusted such that the distance between the sling 30 and the basket 20 is variable. The debris opening 13 traverses through the lateral wall 11 and is positioned adjacent to the sling 30.

Figure 8:
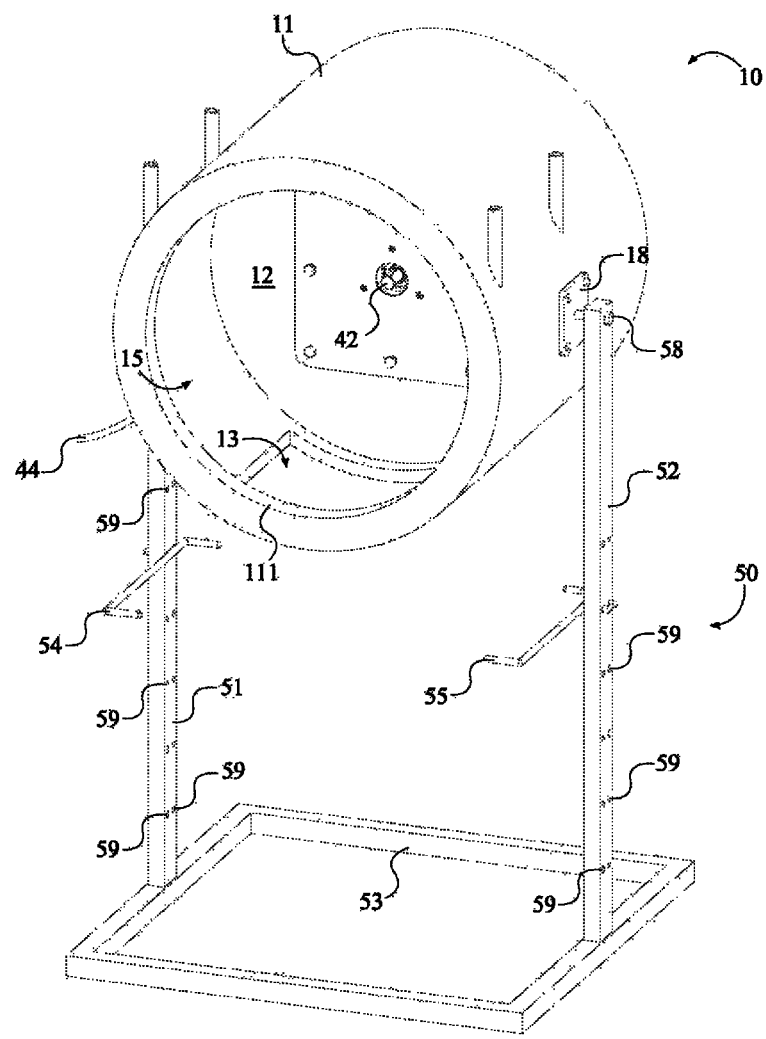
FIG. 8 is a perspective view of the present invention with the basket and the sling removed from the trimmer body.
Figure 9:
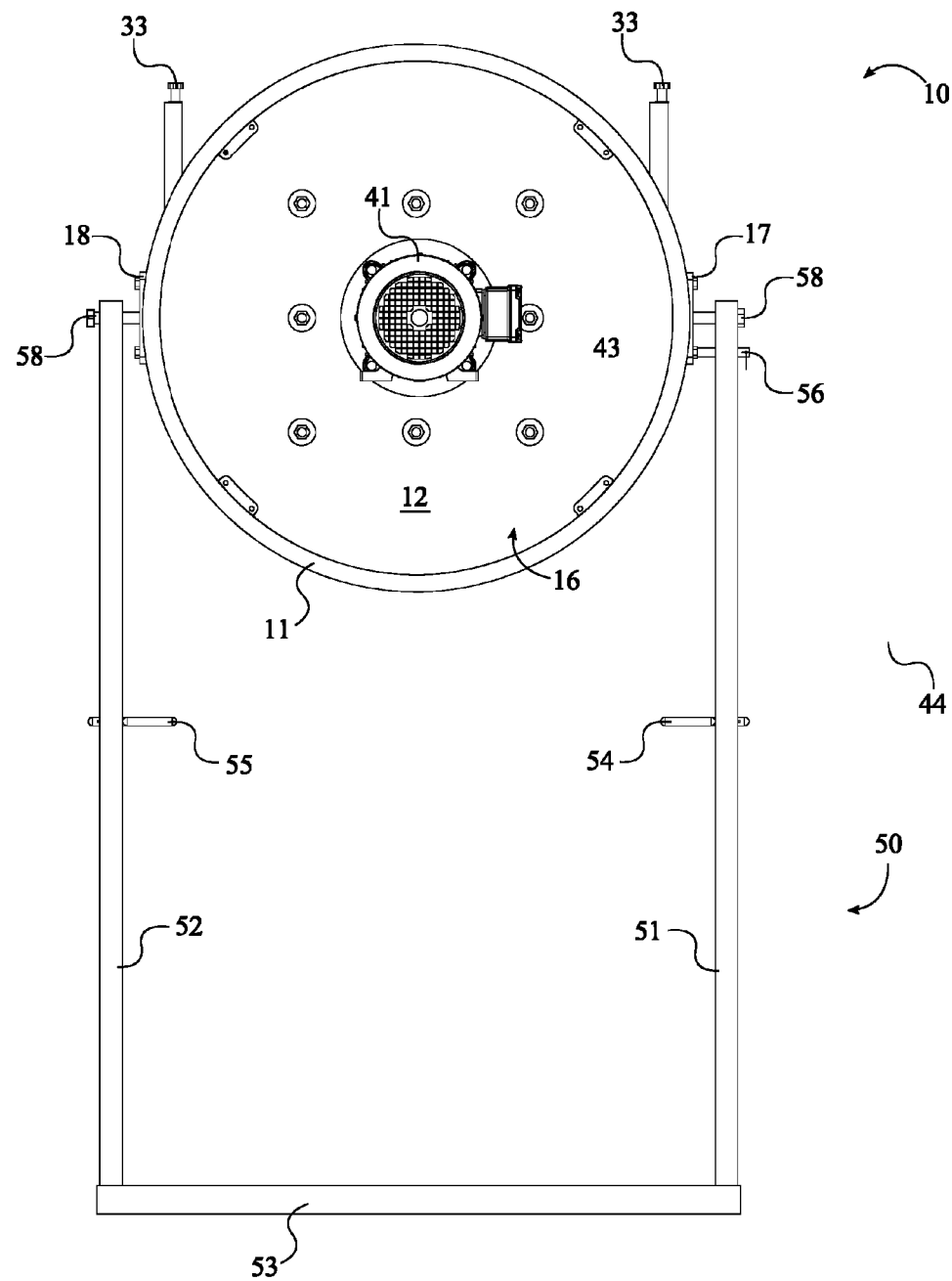
FIG. 9 is a rear elevational view of the present invention with the access panel removed.

In reference to FIG., the motor assembly 40 comprises a motor 41, a drive shaft 42, a timer 43 and a power cable 44. In reference to FIG. 9, the motor 41 is positioned within the second trimmer body section 16. The motor 41 is adjacently connected to both the divider wall 12 and the motor 41 mounting plate, wherein the motor 41 mounting plate provides additional strength and support to the divider wall 12. The drive shaft 42 is rotatably connected to the motor 41 and traverses through the divider wall 12 and the motor 41 mounting plate. The motor 41 is mounted in the center or near center of the trimmer body 10, such that the drive shaft 42 is concentrically positioned within the lateral wall 11, as shown in FIG. 8.

Figure 5:
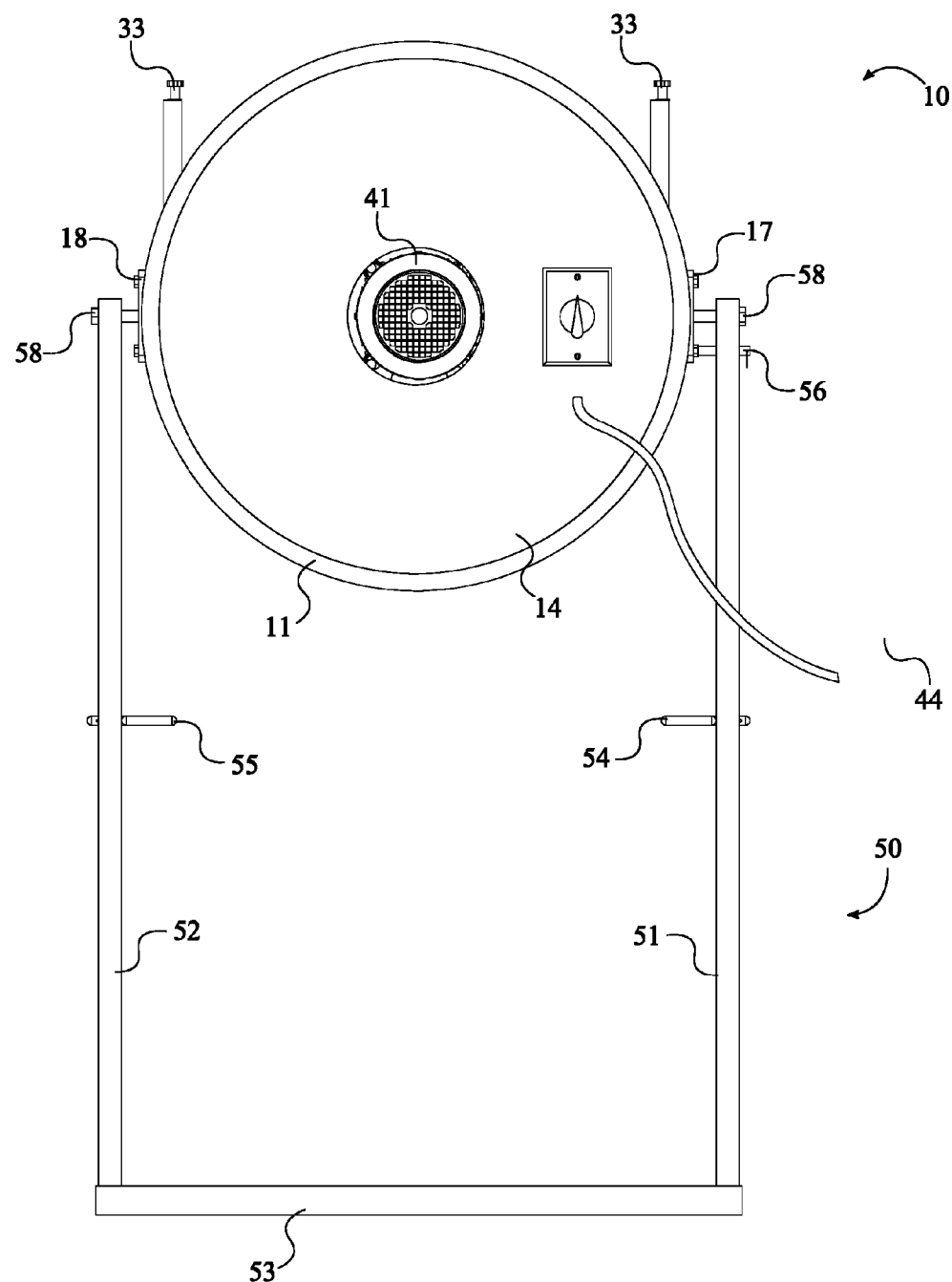
FIG. 5 is a rear elevational view of the present invention.
Figure 15:
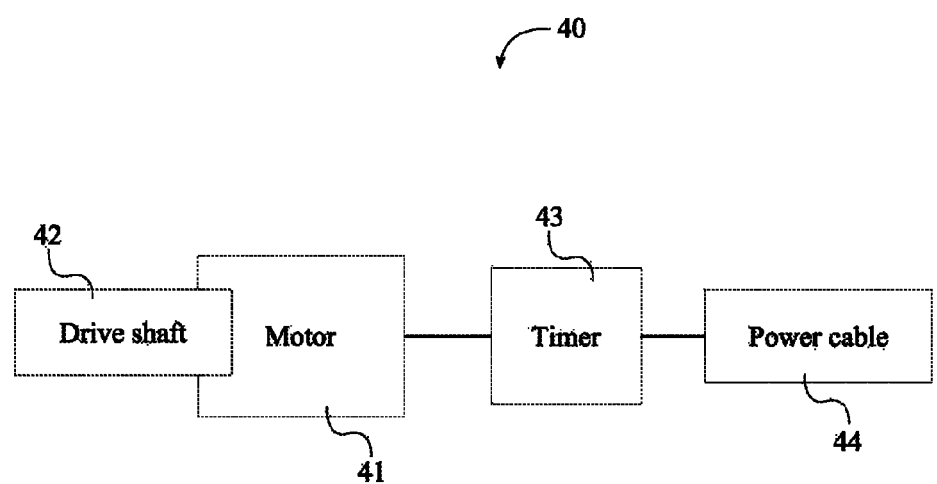
FIG. 15 is a diagram depicting the electrical connections of the motor assembly.

In reference to FIG. 5 and FIG. 15, the timer 43 is adjacently connected to the trimmer body 10 and is electrically connected to the motor 41. The timer 43 is mounted to the trimmer body 10 through a hole cut in the access panel 14, adjacent to the second trimmer body section 16. The timer 43 allows the user to determine the duration of time for which the motor 41 is powered on. Any interval of time can be selected by adjusting a timer 43 knob located on the outside of the lateral wall 11. The timer 43 is electrically connected to a power source in order to control the electrical current delivered to the motor 41. In the preferred embodiment of the present invention, a power cable 44 is electrically connected to the timer 43, such that current can be supplied from a power source having an outlet. The power cable 44 can be attached to any power source that can provide the energy required to power the motor 41. It is also possible for the power source to be battery or similar portable source of electrical current.

In reference to FIG. 5, the access panel 14 is used to secure the second trimmer body section 16 closed. As such, the access panel 14 is attached to the lateral wall 11 and is positioned about the second trimmer body section 16 opposite the divider wall 12, wherein the motor 41 is positioned in between the access panel 14 and the divider wall 12. A hole is cut through the center of the access panel 14 and provides ventilation for the second trimmer body section 16, such that the motor 41 does not overheat. The access panel 14 is removable from the lateral wall 11, such that maintenance can be performed on the motor 41 or the timer 43. The access panel 14 can be secured to the trimmer body 10 using any number of attachment methods, such as using screws, magnets or a locking system.

The basket 20 is attached to the motor 41, as shown in FIG. 6-7, and is used to hold the product that is being trimmed. In the preferred embodiment of the present invention, the basket 20 is made from metal, however, it can be made from any other material. The basket 20 comprises a basket base 21, a lateral basket wall 22, a plurality of basket slits 23, and a basket lid 24. The basket base 21 is circular and is concentrically connected to the drive shaft 42 using a screw connection; however, it is possible for the basket base 21 to be attached to the drive shaft 42 in any other way. In reference to FIG. 10-11, the lateral basket wall 22 is perimetrically connected to the basket base 21 opposite the divider wall 12. The basket lid 24 is perimetrically attached to the lateral basket wall 22 opposite the basket base 21. In the preferred embodiment of the present invention, the basket lid 24 is made from poly(methyl methacrylate), however, it can be made from any other material.

Figure 10:
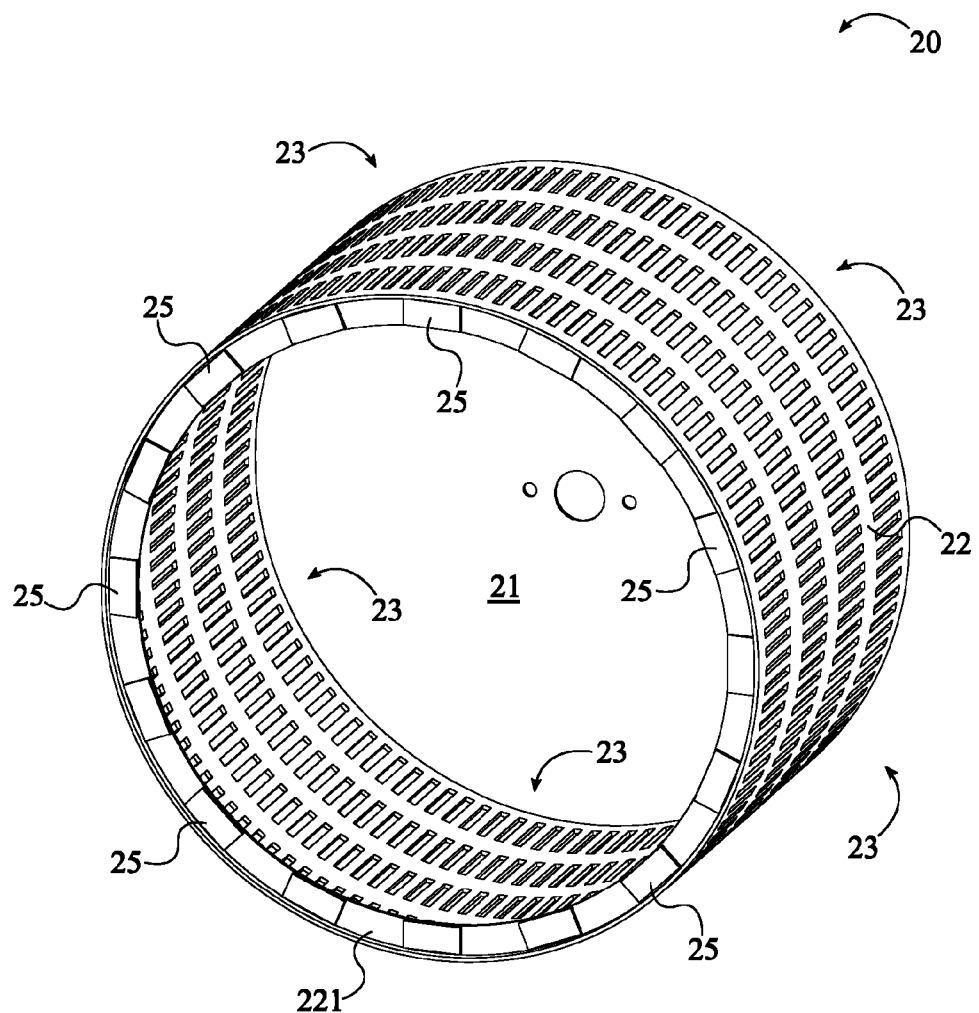
FIG. 10 is a perspective view of the basket of the present invention.
Figure 12:
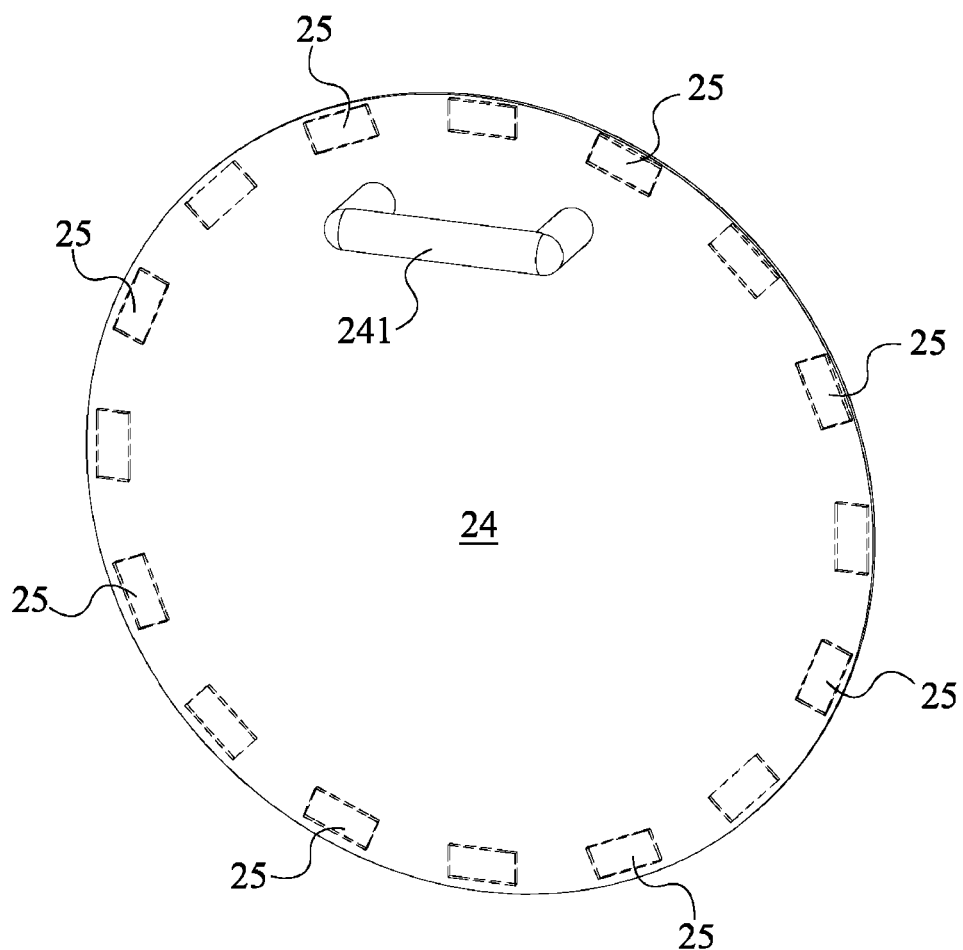
FIG. 12 is a perspective view of the basket lid.

In reference to FIG. 10, the lateral basket wall 22 comprises an inner basket lip 221 that is positioned around the lateral basket wall 22 opposite the basket base 21. The inner basket lip 221 provides the section of the lateral basket wall 22 to which the basket lid 24 is attached. The basket 20 further comprises a plurality of magnets 25; the plurality of magnets 25 being perimetrically connected to the basket lid 24, as shown in FIG. 12, and the lateral basket wall 22, more specifically the inner basket lip 221, as shown in FIG. 10. In reference to FIG. 2, when the basket lid 24 is placed on the inner basket lip 221, the plurality of magnets 25 engages each other and the basket lid 24 is magnetically attached to the lateral basket wall 22. The plurality of magnets 25 allows the basket lid 24 to be quickly and easily attached to or removed from the lateral basket wall 22 as desired. It is also possible for the basket lid 24 to be secured to the lateral basket wall 22 using any other methods of attachment.

In reference to FIG. 12, the basket lid 24 comprises a handle 241 for removing the basket lid 24 from the lateral basket wall 22. The handle 241 is positioned on the basket lid 24 opposite the lateral basket wall 22, such that the handle 241 is mounted on the outwards facing surface of the basket lid 24.

Figure 11:
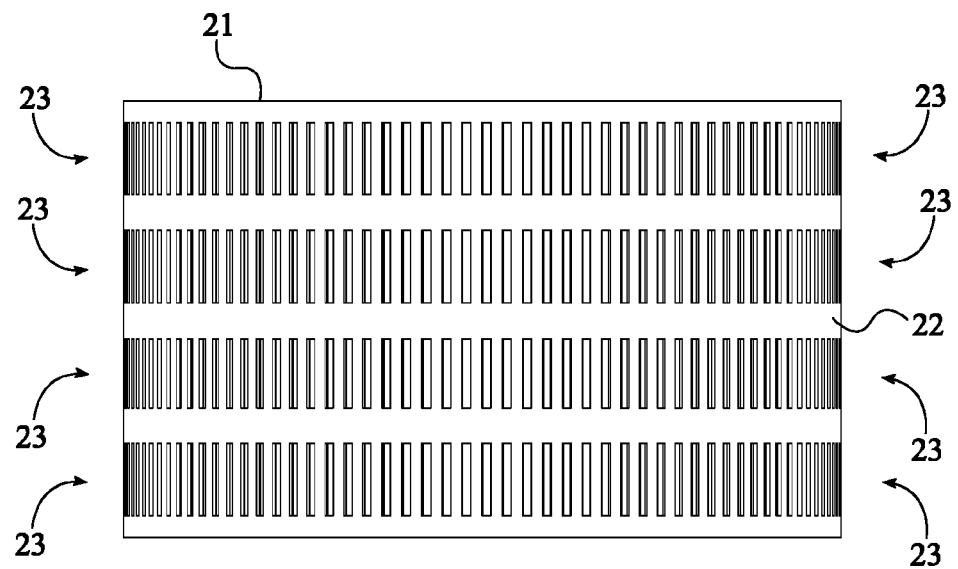
FIG. 11 is a top plan view of the basket of the present invention.

In reference to FIG. 10-11, the plurality of basket slits 23 traverses through the lateral basket wall 22 and the plurality of basket slits 23 is positioned around the lateral basket wall 22. In the preferred embodiment of the present invention, each of the plurality of basket slits 23 is rectangular; however, it is possible for the plurality of basket slits 23 to be any shape. The plurality of basket slits 23 can also be any size and can be spaced at any distance in relation to one another, as well as spaced in any pattern. In the preferred embodiment of the present invention, the plurality of basket slits 23 is positioned such that each row is staggered from the other. Each of the plurality of basket slits 23 is perpendicular in relation to the edges of the lateral basket wall 22, however, it is possible for the plurality of basket slits 23 to be angled.

Figure 13:
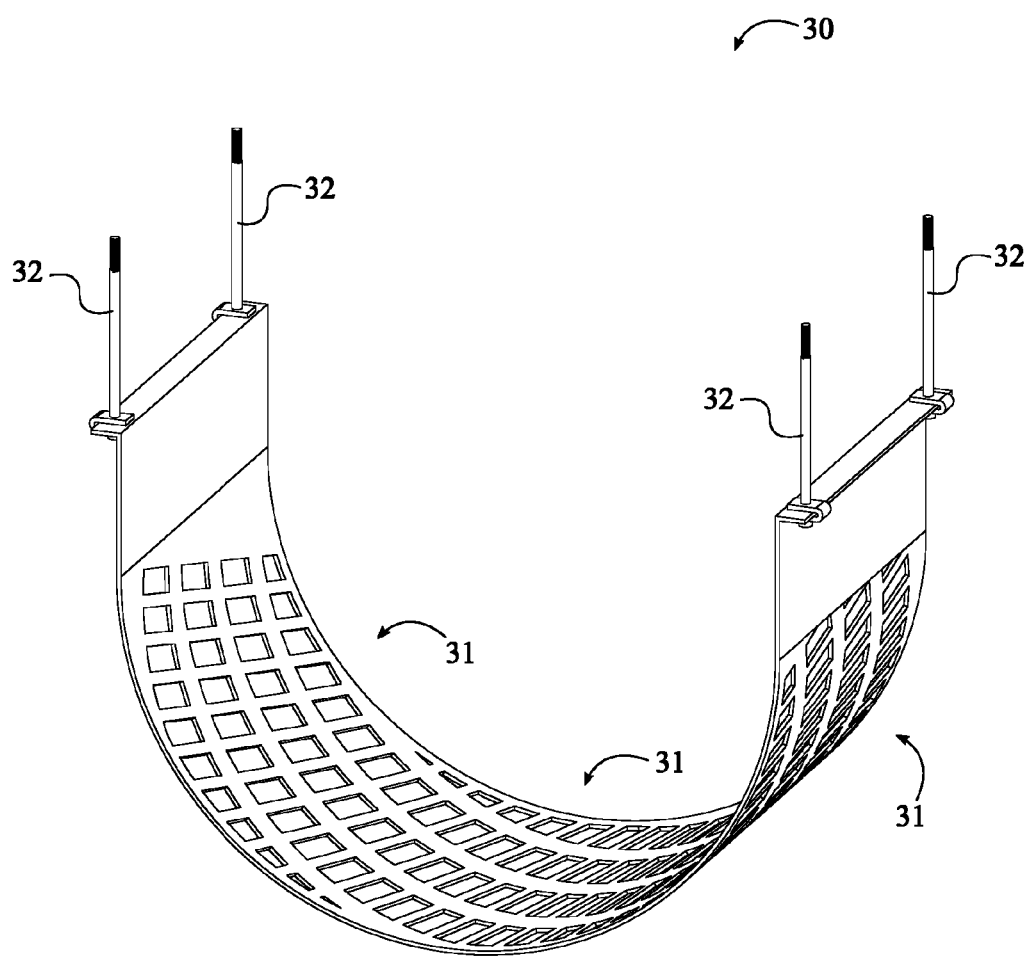
FIG. 13 is a perspective view of the sling of the present invention.
Figure 14:
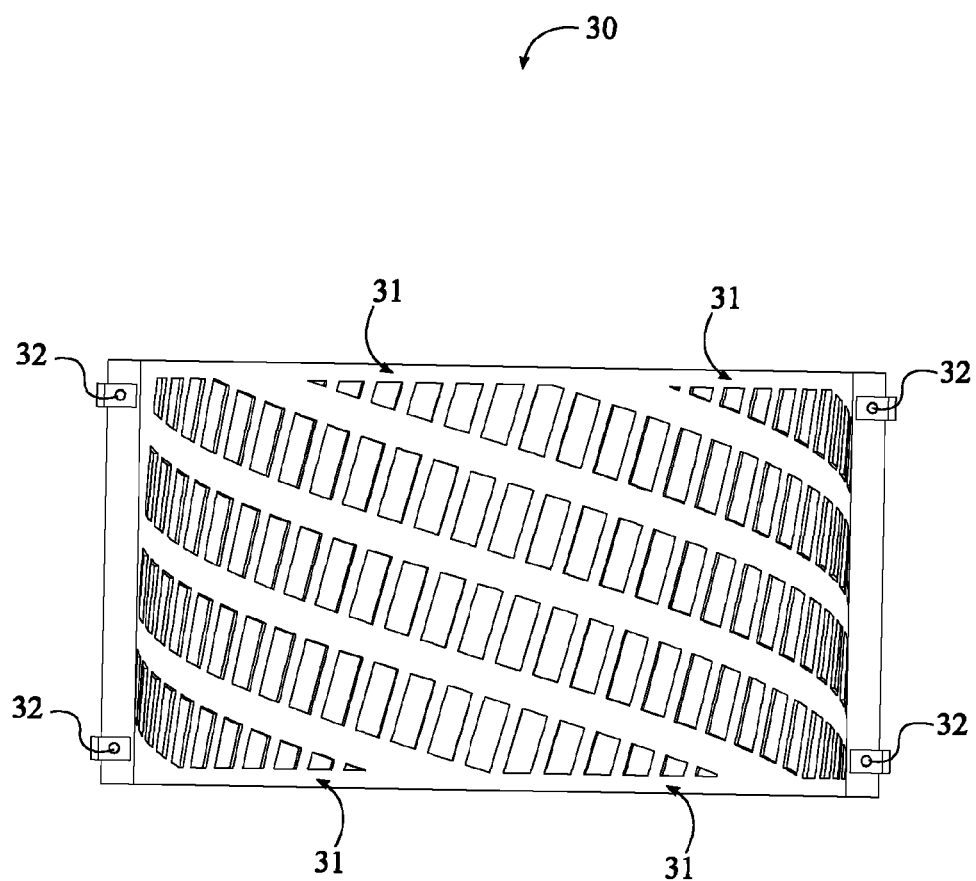
FIG. 14 is a top plan view of the sling of the present invention.

In reference to FIG. 13-14, the sling 30 comprises a plurality of sling slits 31, a plurality of bolts 32, and a plurality of adjustment knobs 33. In the preferred embodiment of the present invention, the sling 30 is made from metal, however, it can be made from any other material. The sling 30 is a U-shaped piece of material, wherein the curved portion has a radius that is slightly larger than the radius of the lateral basket wall 22. In this way, the sling 30 runs around the lateral basket wall 22 when the sling 30 is mounted to the lateral wall 11 of the trimmer body 10. The plurality of bolts 32 are positioned opposite each other along the sling 30, wherein each of the plurality of bolts 32 extends from the end of the sling 30. The plurality of threaded bolts traverses through the lateral wall 11 opposite the debris opening 13 and the plurality of adjustment knobs 33 is attached to the plurality of bolts 32 opposite the first trimmer body section 15.

More specifically, each of the plurality of bolts 32 is inserted through a hole drilled through the top of the lateral wall 11 (when the trimmer body 10 is in the in-use position). A plurality of washers is placed around the plurality of threaded bolts, such that the plurality of washers is positioned in between the lateral wall 11 and the plurality of adjustment knobs 33. In the preferred embodiment of the present invention, the plurality of adjustment knobs 33 are made of plastic, however, the plurality of adjustment knobs 33 may be constructed from any material. Additionally, in the preferred embodiment of the present invention, the plurality of bolts 32 are connected to the body of the sling 30 by a plurality of clips. The plurality of clips are positioned through a plurality of apertures in each end of the body of the sling 30 and provide a cavity for receiving the plurality of bolts 32. The plurality of bolts 32 are snapped into place within the plurality of clips and securely connected to the body of the sling 30.

In reference to FIG. 13-14, the plurality of sling slits 31 is positioned along the sling 30 in between the plurality of bolts 32. Each of the plurality of sling slits 31 is rectangular in shape and is angled in relation to the front and back edges of the sling 30, as shown in FIG. The plurality of sling slits 31 can be any shape or size and can be oriented at any angle or in any pattern. The plurality of adjustment knobs 33 are threaded onto the plurality of bolts 32, which allows the user to adjust the height at which the sling 30 rests in relation to the lateral basket wall 22. By tightening the plurality of adjustment knobs 33, the sling 30 is brought closer to the lateral basket wall 22, while loosening the plurality of adjustment knobs 33 moves the sling 30 further away from the lateral basket wall 22. In this way, the sling 30 can be adjusted or removed to perform maintenance, or to set the level of trim.

In reference to FIG. 1, the pivot stand 50 supports the trimmer body 10. In the preferred embodiment of the present invention, the pivot stand 50 is made from metal, however, it can be constructed from any other material. The pivot stand 50 comprises a first vertical member 51, a second vertical member 52, a stand base 53, a first receptacle attachment 54, a second receptacle attachment 55, and a locking pin 56. The first vertical member 51 and the second vertical member 52 support the trimmer body 10, while the stand base 53 stabilizes the present invention such that it does not fall over. In the preferred embodiment of the present invention, the stand base 53 is square in shape, however, it is possible for the base stand to be any other shape.

Both the first vertical member 51 and the second vertical member 52 comprise a pivot hole 57 and a pivot bolt 58 through which the trimmer body 10 is pivotally connected to the first vertical member 51 and the second vertical member 52. The stand base 53 is adjacently connected to the first vertical member 51 and the second vertical member 52 opposite the trimmer body 10. As such, the pivot hole 57 of the first vertical member 51 is cut through the top of the first vertical member 51 and the pivot hole 57 of the second vertical member 52 is cut through the top of the second vertical member 52. The pivot bolt 58 of the first vertical member 51 is positioned through the pivot hole 57 of the first vertical member 51 and engages the first mount plate 17. Similarly, the pivot bolt 58 of the second vertical member 52 is positioned through the pivot hole 57 of the second vertical member 52 and engages the second mount plate 18. The pivot bolt 58 of the first vertical member 51 and the pivot bolt 58 of the second vertical member 52 allow the trimmer body 10 to rotate three hundred and sixty degrees.

In reference to FIG. 3, the locking pin 56 engages the trimmer body 10 and is used to secure the trimmer body 10 at the desired angle (e.g. the product loading position and the in-use position). The locking pin 56 is a cylindrical piece of material that is inserted through a hole in the first vertical member 51 adjacent to the pivot hole 57 of the first vertical member 51. The locking pin 56 engages the at least one recess 171 of the first mount plate 17, thus locking the trimmer body 10 in place. The engagement of the locking pin 56 and the first mount plate 17 can be designed such that the trimmer body 10 can be locked in place at any angle.

In reference to FIG. 3, the first receptacle attachment 54 is attached to the first vertical member 51 in between the stand base 53 and the trimmer body 10. Similarly, the second receptacle attachment 55 is attached to the second vertical member 52 in between the stand base 53 and the trimmer body 10. The first receptacle attachment 54 and the second receptacle attachment 55 can be positioned at various heights and provide a flat surface, track, hook or other means of securing a receptacle to the pivot stand 50. The receptacle can be a tray, bag or any other type of container and is used to collect the trimmings dispensed through the debris opening 13 in the bottom of the lateral wall 11 of the trimmer body 10.

Figure 2:
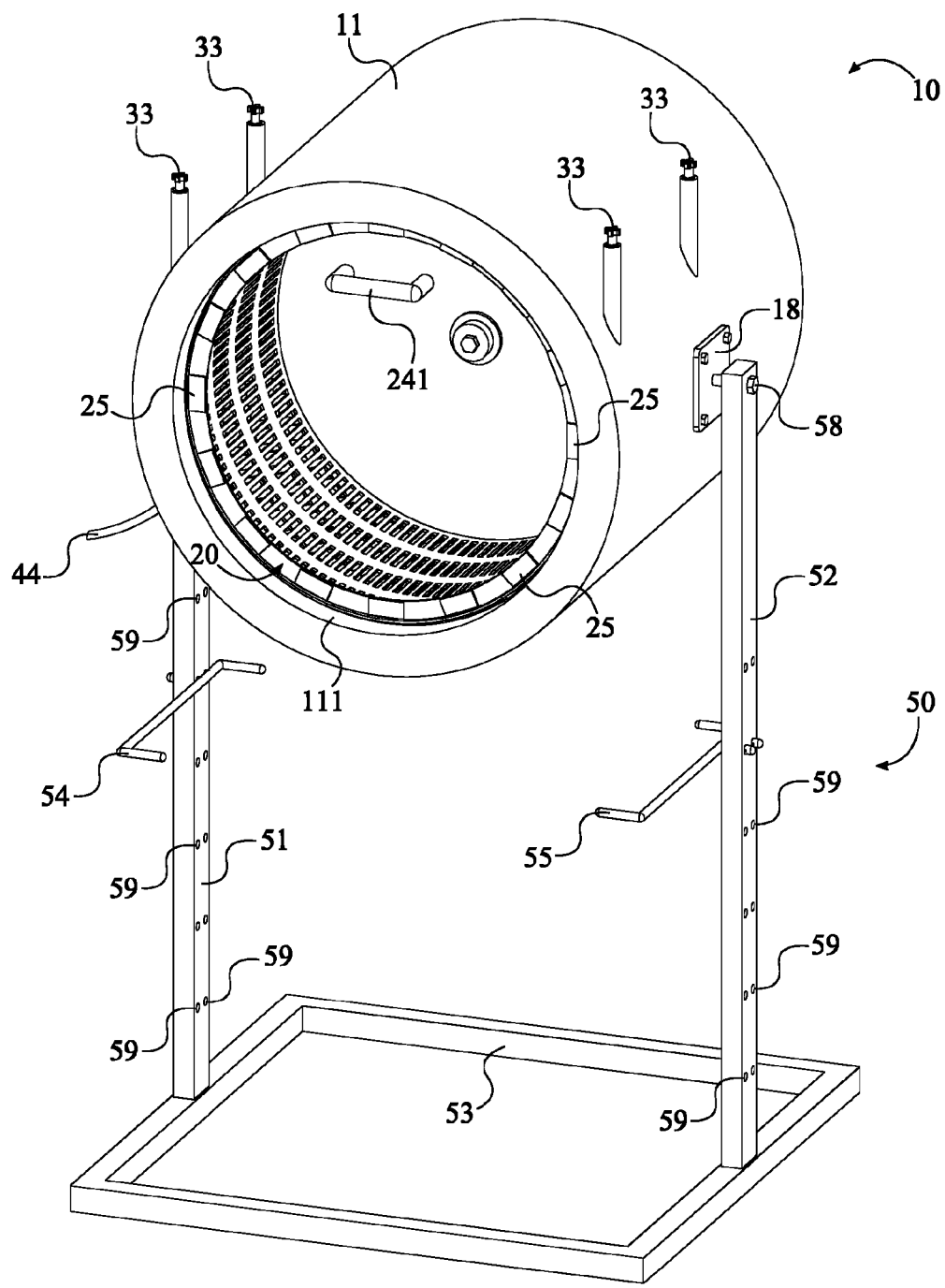
FIG. 2 is a perspective view of the present invention with the basket lid attached to the lateral basket wall by the plurality of magnets.

In the preferred embodiment of the present invention, a plurality of holes 59 are cut into both the first vertical member 51 and the second vertical member 52, as shown in FIG. 1-2. The plurality of holes 59 are positioned along the first vertical member 51 and the second vertical member 52 and allow the first receptacle attachment 54 and the second receptacle attachment 55 to be readily positioned at various heights; wherein the first receptacle attachment 54 and the second receptacle attachment 55 are slotted into the plurality of holes 59. It is also possible for the first receptacle attachment 54 and the second receptacle attachment 55 to be connected to the bottom of the trimmer body 10 adjacent to the debris opening 13.

The leafy plant trimmer can be used to trim and manicure any type of leafy plant. To use the present invention, the trimmer body 10 is first rotated to the product loading position and the product to be trimmed is loaded into the basket 20 of the leafy plant trimmer. Once the product has been loaded, the basket lid 24 is secured to the lateral basket wall 22 to prevent any product from falling out of the basket 20. The trimmer body 10 is then rotated to the in-use position and locked in place using the locking pin 56. The timer 43 is then set to the desired amount of time and the leafy plant trimmer is turned on. When the leafy plant trimmer is turned on, power is supplied to the motor 41 which then acts to spin the basket 20 through the drive shaft 42. The sling 30 remains stationary as the basket 20 spins, creating a pulling motion between the plurality of basket slits 23 and the plurality of sling slits 31 that acts to trim the product. The sling 30 is positioned further away from the basket 20 towards the bottom of the basket 20 to allow the leaves of the product to fall through the plurality of baskets slits 23 into the gap between the sling 30 and the basket 20. The sling 30 is positioned closer to the basket 20 along the sides, such that the leaves of the product are pinched in between the plurality of basket slits 23 and the plurality of sling slits 31 as the basket 20 rotates. The rotation of the basket 20 and the pinching of the leaves creates a pulling action that dismembers the leaves from the product. As the product is trimmed, the trimmings are collected in the receptacle mounted to the pivot stand 50, below the trimmer body 10. Once the product has been trimmed the basket lid 24 can be removed. The locking pin 56 can then be removed as well, allowing the trimmer body 10 to be angled downwards to empty the contents of the basket 20.

In an alternative embodiment of the present invention, the pivot stand 50 further comprises a plurality of wheels and the trimmer body 10 further comprises at least one handle 241. The plurality of wheels is attached to the back section of the stand base 53 and may be raised above the ground or come in contact with the ground when the present invention is placed upright in a stable position. Each of the plurality of wheels may feature a locking mechanism, such that the plurality of wheels can be locked, wherein the plurality of wheels cannot be rotated. The at least one handle 241 is attached to the back or sides of the lateral wall 11 of the trimmer body 10. In this way, the leafy plant trimmer can easily be transported by a single person by tilting the leafy plant trimmer backwards and engaging the plurality of wheels with the ground.

Although the invention has been explained in relation to its preferred embodiment, it is to be understood that many other possible modifications and variations can be made without departing from the spirit and scope of the invention as hereinafter claimed.

What is claimed is:

1. A leafy plant trimmer comprises:
a trimmer body;
a basket;
a sling;
a motor assembly;
the trimmer body comprises a lateral wall;
the basket comprises a basket base, a lateral basket wall, and a plurality of basket slits;
the sling comprises a plurality of sling slits;
the motor assembly comprises a motor and a drive shaft;
the basket and the motor assembly being positioned within the trimmer body;
the drive shaft being rotatably connected to the motor;
the basket base being concentrically connected to the drive shaft;
the lateral basket wall being perimetrically connected to the basket base;
the plurality of basket slits traversing through the lateral basket wall;
the plurality of basket slits being positioned around the lateral basket wall;
the sling being connected to the lateral wall;
the sling being positioned around the basket within the trimmer body; and
the plurality of sling slits being positioned adjacent to the plurality of basket slits.

2. The leafy plant trimmer as claimed in claim 1 comprises:
a pivot stand; and
the trimmer body being pivotally connected to the pivot stand.

3. The leafy plant trimmer as claimed in claim 2 comprises:
the pivot stand comprises a locking pin; and
the locking pin engaging the trimmer body.

4. The leafy plant trimmer as claimed in claim 1 comprises:
the trimmer body further comprises a divider wall;
the divider wall being positioned within the lateral wall; and
the divider wall being perimetrically connected to the lateral wall.

5. The leafy plant trimmer as claimed in claim 1 comprises:
the trimmer body further comprises a divider wall;
the divider wall separating the trimmer body into a first trimmer body section and a second trimmer body section;
the motor being positioned within the second trimmer body section;
the drive shaft traversing through the divider wall into the first trimmer body section; and
the basket being positioned within the first trimmer body section.

6. The leafy plant trimmer as claimed in claim 5 comprises:
the trimmer body further comprises an access panel;
the access panel being adjacently attached to the lateral wall;
the access panel being positioned about the second trimmer body section opposite the divider wall; and
the motor being positioned in between the access panel and the divider wall.

7. The leafy plant trimmer as claimed in claim 5 comprises:
the lateral wall comprises a lip;
the lip being positioned within the first trimmer body section;
the lip being positioned opposite the divider wall along the first trimmer body section; and
the basket and the sling being positioned in between the lip and the divider wall.

8. The leafy plant trimmer as claimed in claim 5 comprises:
the motor being adjacently connected to the divider wall.

9. The leafy plant trimmer as claimed in claim 1 comprises:
the basket further comprises a basket lid; and
the basket lid being perimetrically attached to the lateral basket wall opposite the basket base.

10. The leafy plant trimmer as claimed in claim 9 comprises:
the basket lid comprises a handle; and
the handle being positioned on the basket lid opposite the lateral basket wall.

11. The leafy plant trimmer as claimed in claim 9 comprises:
the basket further comprises a plurality of magnets;

the plurality of magnets being perimetrically connected to the lateral basket wall and the basket lid; and the plurality of magnets engaging each other, wherein the basket lid is magnetically attached to the lateral basket wall.

12. The leafy plant trimmer as claimed in claim 1 comprises:

the trimmer body further comprises a debris opening;

the debris opening traversing through the lateral wall; and the debris opening being positioned adjacent to the sling.

13. The leafy plant trimmer as claimed in claim 12 comprises:

the sling further comprises a plurality of bolts; and the plurality of bolts traversing through the lateral wall opposite the debris opening.

14. The leafy plant trimmer as claimed in claim 1 comprises:

the sling further comprises a plurality of bolts and a plurality of adjustment knobs;

the plurality of bolts being positioned opposite each other along the sling;

the plurality of bolts traversing through the lateral wall; and the plurality of adjustment knobs being threaded onto the plurality of bolts.

15. The leafy plant trimmer as claimed in claim 1 comprises:

the motor assembly further comprises a timer;

the timer being adjacently connected to the trimmer body; and the timer being electrically connected to the motor.

16. The leafy plant trimmer as claimed in claim 1 comprises:

a pivot stand;

the pivot stand comprises a first vertical member, a second vertical member, and a stand base;

the trimmer body being pivotally connected to the first vertical member and the second vertical member; and the stand base being adjacently connected to the first vertical member and the second vertical member opposite the trimmer body.

17. The leafy plant trimmer as claimed in claim 16 comprises:

the pivot stand further comprises a first receptacle attachment and a second receptacle attachment;

the first receptacle attachment being adjacently attached to the first vertical member in between the stand base and the trimmer body; and the second receptacle attachment being adjacently attached to the second vertical member in between the stand base and the trimmer body.

* * * * *